United States Patent [19]

Ziegler

[11] 4,097,029
[45] Jun. 27, 1978

[54] ENCLOSURE FOR STEEL CONVERTING APPARATUS

[75] Inventor: Joseph Ziegler, Apollo, Pa.

[73] Assignee: Pennsylvania Engineering Corporation, Pittsburgh, Pa.

[21] Appl. No.: 645,529

[22] Filed: Dec. 31, 1975

[51] Int. Cl.² .............................................. C21C 5/42
[52] U.S. Cl. ..................................... 266/142; 49/118; 266/158
[58] Field of Search ................ 49/118, 123, 360, 411; 52/302; 110/173 R, 173 C, 176, 177; 266/142, 144, 158

[56] References Cited

U.S. PATENT DOCUMENTS

| | | | |
|---|---|---|---|
| 1,658,640 | 2/1928 | Huberty | 49/118 |
| 1,881,287 | 10/1932 | Miller | 110/173 R |
| 2,929,115 | 3/1960 | Beckstrom | 105/378 |
| 3,245,178 | 4/1966 | Clark | 49/123 |
| 3,604,362 | 9/1971 | Goirand | 104/89 X |
| 3,743,264 | 7/1973 | Baum et al. | 266/158 X |
| 3,814,022 | 6/1974 | Smith | 104/89 |
| 3,872,622 | 3/1975 | Berk | 49/118 |
| 3,913,898 | 10/1975 | Wolters | 266/142 |

*Primary Examiner*—Roy Lake
*Assistant Examiner*—Paul A. Bell
*Attorney, Agent, or Firm*—Fred Wiviott

[57] ABSTRACT

An open-topped vessel for converting molten ferrous metal to steel is pivotal about a horizontal axis and has bottom tuyeres for blowing oxygen or other gases upwardly through molten metal. An enclosure at least partially surrounds the vessel and cooperates with a smoke hood to prevent the escape of pollutants when the vessel is in its vertical position. A pair of access doors are provided for closing an opening provided in the enclosure laterally of the vessel tilt axis. The doors are mounted for movement in opposite directions on roller support means external of the enclosure and an auxiliary smoke hood is mounted in the enclosure above the opening for capturing pollutants when the vessel is tilted toward said opening for being charged.

19 Claims, 4 Drawing Figures

ENCLOSURE FOR STEEL CONVERTING APPARATUS

BACKGROUND OF THE INVENTION

This invention relates to enclosures for steel conversion apparatus.

One type of steel conversion apparatus includes an open-topped vessel having tuyeres extending through its lower end for injecting oxygen beneath the level of molten metal within the vessel. In addition, a hydrocarbon shielding fluid, such as light oil or propane, is injected in surrounding relation to the oxygen for prolonging tuyere life. As a result of the reactions within the vessel and the disassociation of the shielding fluid, pollutant gases and particulate material are discharged from the open upper end of the vessel. In order to prevent the discharge of these pollutants, such vessels are often provided with a smoke hood coupled to a gas cleaning system. Such smoke hoods are normally disposed above the open upper end of the vessel and are incapable of completely collecting off-gases when the vessel is tilted for receiving hot metal or scrap. Accordingly, an enclosure may be provided around the vessel for preventing discharge of pollutants during such charging operations. An access door in one side of the enclosure may be opened and closed for periodic charging. Prior art enclosure doors, however, were not wholly satisfactory because their support rollers and rails tended to become coated and clogged with material discharging from the vessel.

SUMMARY OF THE INVENTION

A general object of the invention is to provide apparatus for preventing the discharge of pollutants from steel conversion vessels when the latter are in each of various alternate positions.

A further object of the invention is to provide a new improved access door for steel converter enclosures.

Another object of the invention is to provide a support assembly for such access doors which is positioned to reduce exposure to material discharging from the vessel and also to reduce interference with vessel charging operation.

Yet another object of the invention is to provide an operating assembly for metallurgical vessel enclosures having a pair of doors which insures door operation should the operator for one door fail.

These and other objects and advantages of the present invention will become more apparent from the detailed description thereof taken with the accompanying drawings.

DESCRIPTION OF THE PREFERRED EMBODIMENT

Figure 1:
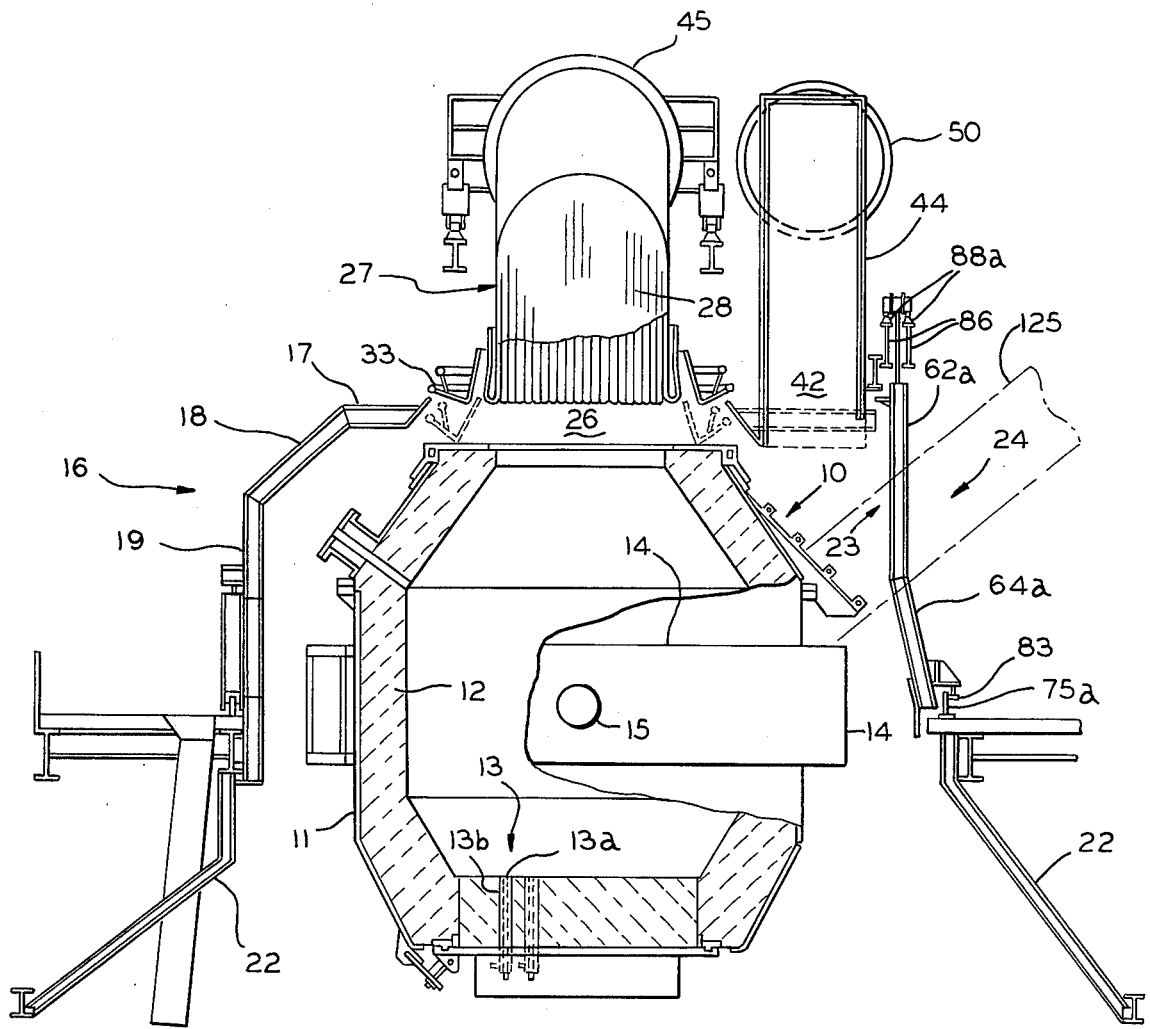
FIG. 1 is a front elevational view, partly in section, of a converter vessel and off-gas collecting system.
Figure 4:
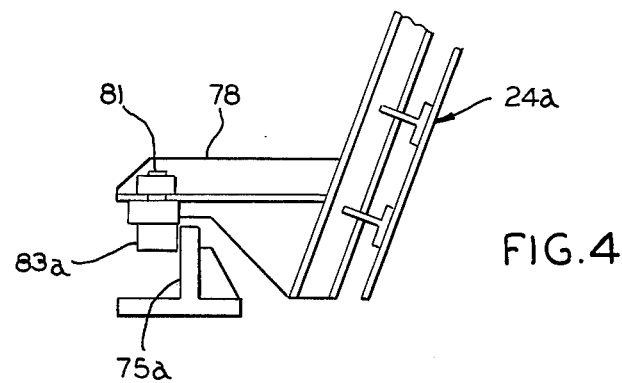
FIG. 4 is a view taken along lines 4—4 of FIG. 2.
Figure 3:
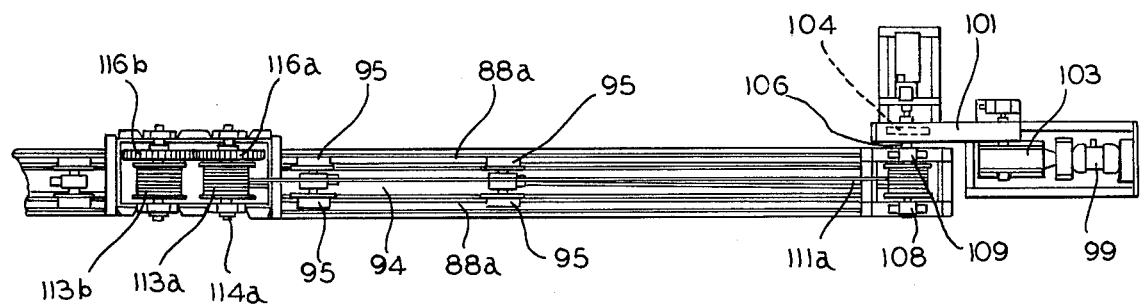
FIG. 3 is a view taken along lines 3—3 of FIG. 2.

The invention will be illustrated and discussed with respect to a bottom blown converter vessel 10 shown in FIG. 1 although those skilled in the art will appreciate that it has application to other types of conversion vessels as well, such as basic oxygen and argon-oxygen systems.

The vessel 10 is open at its upper end and includes a metallic shell 11 and refractory lining 12. A plurality of tuyeres 13 extends through the lower end of the vessel and includes an inner tuyere pipe 13a and an outer tuyere pipe 13b to permit the injection of oxygen and a hydrocarbon shielding fluid as will be discussed more fully below. Converter vessels of the type illustrated are generally supported in a conventional manner on a trunnion ring 14 which has a trunnion pin 15 extending from each of its opposite sides. The trunnion pins 15 are suitably supported in a well-known manner on conventional bearing structures (not shown) and are coupled to a suitable drive mechanism (not shown) for tilting the vessel to each of a plurality of positions as may be required during a process cycle.

Figure 2:
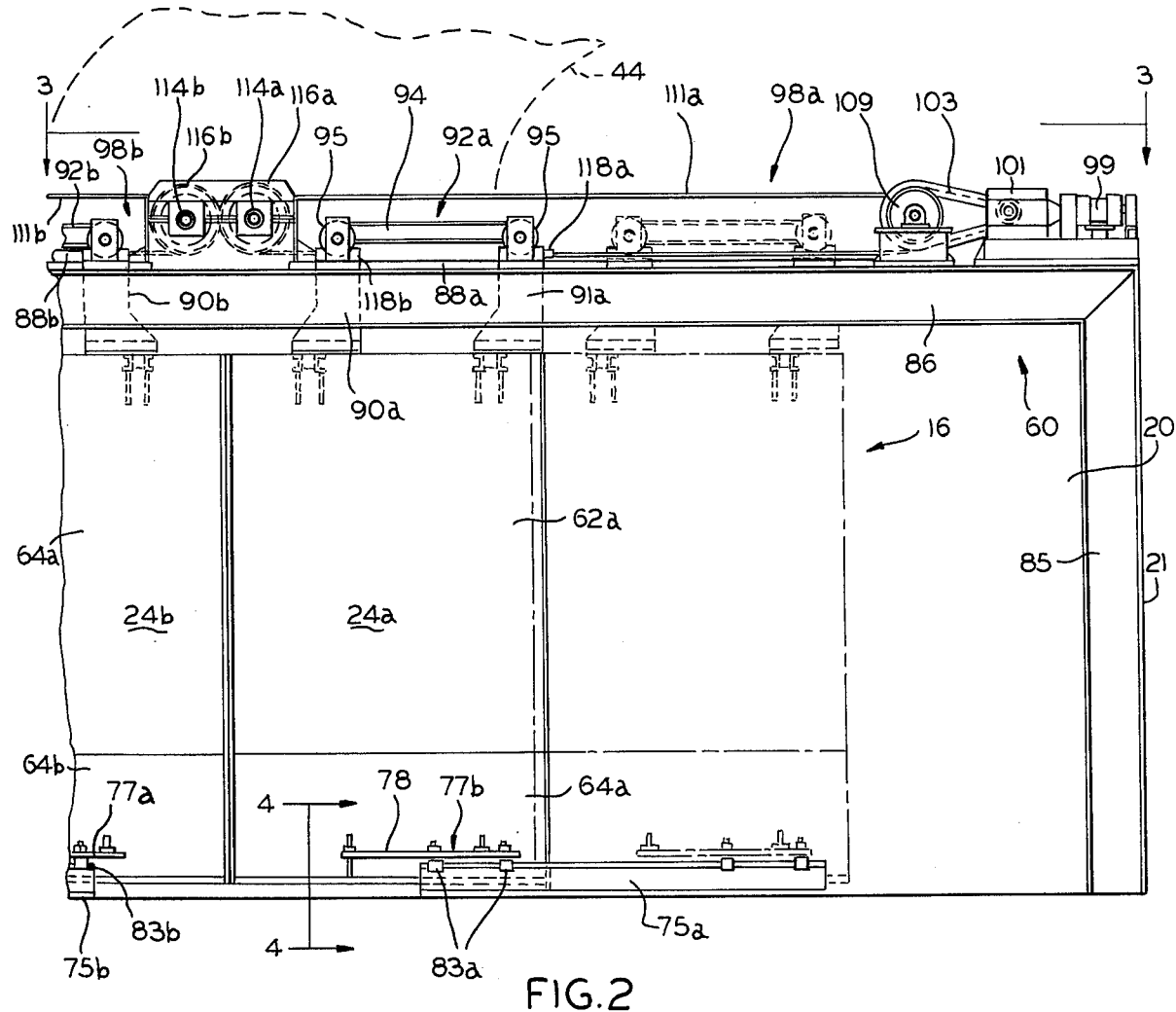
FIG. 2 is a front elevational view of a portion of the apparatus illustrated in FIG. 1.

The vessel 10 is shown in FIG. 1 to be disposed within a metallic enclosure 16 having a top wall 17 disposed above the upper end of the vessel and an inclined back wall portion 18 extending downwardly and outwardly from the top wall 17 and to the upper end of a vertical back wall portion 19. In addition, as seen in FIG. 2, the enclosure 16 includes a front wall 20 and generally vertical end walls 21. Skirt portions 22 extend downwardly and outwardly from the lower ends of the back and front walls 19 and 20. A generally rectangular opening 23 is formed in front wall 20 and to one side of and generally parallel to the axis of the trunnion pins 15. A closure door assembly 24 is mounted for movement into and out of a closed position relative to the opening 23.

A top opening 26 is formed in the top wall 17 for receiving a smoke hood 27 which is preferably water cooled and may be formed of a plurality of individual, longitudinally extending pipes 28 each connected to inlet and outlet manifolds (not shown). A movable skirt 33 is disposed in surrounding relation to the lower end of hood 27 and is movable by means (not shown) between its positions shown by full lines to its position shown by broken lines in FIG. 1.

A second opening 42 is formed in cover 17 at a point above the access opening 23 for receiving the lower end of an auxiliary smoke hood 44. As schematically illustrated in FIG. 1, the primary smoke hood 27 is coupled by a conduit 45 to a gas cleaning system (not shown) which may, for example, include a quencher (not shown) and a gas scrubber (not shown). The quencher and the gas scrubber may be of the variable throat venturi type of wet scrubbers which are well known in the art and which function to remove particulates and lower the off-gas temperature. In addition, means such as a fan (not shown) is coupled to the scrubber for creating a suction under the hood 26 and within the enclosure 16. For a more complete description of the gas cleaning apparatus which may be connected to the smoke hood 26, reference is made to copending application, Ser. No. 340,302, filed Mar. 12, 1973 and assigned to the assignee of the present invention. The auxiliary smoke hood 44 is connected by a second conduit 50 and a valve (not shown) into the gas cleaning system between the quencher and gas scrubber.

The door assembly 24 may comprise two doors 24a and 24b as seen in FIG. 2, and which are mounted for generally horizontal movement away from each other on a support assembly 60. The doors 24a and 24b are identical and accordingly, only door 24a will be described in detail for the sake of brevity. Door 24a includes an upper, generally rectangular, vertically extending portion 62a and a second generally rectangular portion 64a affixed to the lower end of portion 62a and extending obliquely outwardly therefrom to permit the vessel 10 to rotate. The door portions 62a and 64a are defined by an outer metallic frame having the general configuration of the door 24a and rectangular metallic plates and affixed to the outer and inner sides of the frame.

The support assembly 60 includes a first pair of rails 75a and 75b disposed in general alignment and extending respectively from a point adjacent the lower outside corners of doors 24a and 24b outwardly and away from said doors and in general parallelism therewith. Roller assemblies 77a and 77b are mounted respectively at each of said lower outside corners of doors 24a and 24b for cooperative engagement with rails 75a and 75b. Each roller assembly includes a bracket 78 affixed to its associated door panel and each bracket includes suitable bearings for receiving vertically extending shafts 81 of rollers 83.

Support frame 60 also includes a pair of vertical columns 85 disposed on the opposite sides and spaced from door assembly 24, and a pair of horizontal beam members 86 bridging the upper ends of columns 85. Two pairs of generally parallel rails 88a and 88b are mounted on members 86 with one pair being disposed above and in general parallelism with the upper edges of each door 24a and 24b. In addition, a pair of bracket members 90a are affixed to the upper edges of each door 24a in spaced apart relation and extend generally vertically therefrom for being affixed to a car assembly 92a mounted on rails 88a. Each car 92 consists of a generally horizontally extending beam member 94 affixed to the upper ends of brackets 90a and 91a and having a pair of rollers 95 at each end for engaging rails 88a. It will be appreciated that the doors 24a and 24b respectively hang from the rails 88a and 88b and that the outwardly extending portions 64a and 64b of each door creates a clockwise moment as viewed in FIG. 1 so that rollers 83 are urged into positive engagement with the forward surface of the respective rails 75a and 75b.

The doors 24a and 24b may be moved laterally away from each other and toward an open position by a pair of drive assemblies 98a and 98b positioned at the opposite ends of beams 86. The assemblies 98a and 98b are preferably identical but mirror images and accordingly, only the assembly 98a will be discussed and illustrated fully for the sake of brevity. While any suitable type of drive may be employed, in the illustrated embodiment, drive assembly 98a includes an electric motor 99 which is coupled to a sprocket and chain assembly 103 through a gear reducer 101. A second sprocket 104 is mounted on a horizontal shaft 106 journaled for rotation in bearings 108. Also mounted on shaft 106 is a drum 109 around which is wound a wire rope 111a. A second drum 113a is mounted above the meeting point of doors 24a and 24b and on a shaft 114a for rotation about a horizontal axis which is parallel to the axis of shaft 106. Also mounted on shaft 114a is a gear 116a which meshes with a corresponding gear 116b of the drive assembly 98b. The wire rope 111a is also wound around drum 113a and its opposite ends are affixed to the ends of car 92a at 118a and 118b.

The doors 24a and 24b are shown in their closed positions by full lines in FIG. 2. When it is desired to open the doors 24a and 24b, motor 99 is operated to rotate drum 109 counterclockwise so that the end 118a of wire rope 111a moves toward the right, thereby moving the door 24a toward its open position shown by broken lines in FIG. 2. Simultaneously the motor (not shown) of assembly 98b is also operated to move door 24b toward the left in FIG. 2. Conversely when it is desired to close doors 24a and 24b, the drive motor 99 is rotated in the clockwise direction to move the upper strand of wire rope 111a toward the right and consequently the door 24a moves toward the left. Similar operation of the drive motor of assembly 98b closes door 24b.

The gears 116a and 116b perform the function of insuring that both doors 24a and 24b will close should one of the drive motors fail. For example, assume only motor 99 is operative to rotate drum 113a by the action of wire rope 111a while the motor of assembly 98b is inoperative. This will rotate gear 116a and consequently gear 116b so that drum 113b is also caused to rotate. This action will move wire rope 111b in the appropriate direction thereby moving the door 24b.

In operation of the apparatus illustrated in FIGS. 1 and 2, and at the commencement of a treatment cycle, the vessel 10 will initially be pivoted to its position shown by broken lines in FIG. 1 and the doors 24a and 24b will be open to permit the passage of a charging chute 125 into the open end of the vessel. The skirt 33 will also be elevated to its position shown by broken lines to permit rotation of vessel 10. Initially, the vessel may be charged with hot metal and/or scrap, during which time inert gases such as nitrogen or argon may be delivered through the tuyeres 13 or oxygen and fuel may be delivered for preheating the scrap. In either event, the valve (not shown) which couples the auxiliary hood 42 into the gas cleaning system (not shown) will be open and the vent fan (not shown) operating to withdraw gases and particulate materials which may evolve from the vessel.

After the vessel 10 has been charged, it will be rotated to its position shown by full lines in FIG. 1. During this time inert gases will be delivered through the tuyeres 13 and the motors 98a and 98b will be operated to close the doors 24a and 24b. When the vessel 10 has assumed its upright position and the doors have been closed, the main oxygen blow may commence with oxygen being delivered through the inner tuyere pipe 13a and the hydrocarbon shielding fluid delivered through the outer tuyere pipe 13b.

During the initial portion of the oxygen blow, the skirt 33 will remain in an elevated position so that air is drawn around its lower end into the gas cleaning system conduits so as to oxidize combustible gases initially evolving from the vessel 10 so that an inert gas plug passes through the system. When stoichiometric conditions have been achieved, the skirt 33 is lowered to its position shown by broken lines to minimize the intake of air whereby combustible gases such as hydrogen and carbon monoxide which evolve from the vessel may be collected safely. In the event it is necessary to charge the vessel 10 with additional hot metal or scrap or for sampling purposes, the skirt 33 is elevated, the valve (not shown) opened to couple the auxiliary hood 44 to the gas cleaning system (not shown) and the drives 98 operated to reopen the doors 24a and 24b. The vessel 10 may then be rotated to its position shown by broken lines in FIG. 1. If additional gas treatment is required, the just described operation is repeated. It will also be appreciated that when the treatment cycle has been completed, the vessel 10 may be inverted for discharging the metal therein into a molten metal ladle disposed below enclosure 16.

It will be appreciated from the foregoing that because the rollers 83a and 83b move away from the access opening 23 when doors 24a and 24b are open, and also because these rollers are positioned adjacent the outside portions of their respective doors, the likelihood that they will become clogged is substantially diminished. Also, because of the gap between the rails 75a and 75b, these rails do not interfere with charging equipment moving into and out of opening 23. Further, the outward slant of the lower ends 64a and 64b of doors 24a and 24b provides a moment urging rollers 83a and 83b into firm contact with their respective rails 75a and 75b.

I claim:

1. A converter vessel having a metal receiving opening formed adjacent an upper end,
    an enclosure having an upper wall portion disposed above said vessel and side wall portions extending downwardly along the sides of said vessel,
    an access opening formed in one of said wall portions, door means mounted adjacent said opening and externally of said enclosure, said door means having an inner surface facing said vessel and an outer surface,
    mounting means disposed externally of said enclosure for movably supporting said door means and including first rail means adjacent the upper end of said door means and second rail means disposed adjacent the lower end of said door means,
    first roller means mounted on said door means externally of said access opening for engaging said first rail means, said second rail means has one end adjacent one side of said opening and extends therefrom laterally away from said opening so that a substantial portion of the lower end of said opening is not fronted by said second rail means,
    second roller means mounted adjacent the outer surface of said door and the lower end thereof and adjacent one side thereof for engaging said second rail means, said second rail means having a surface portion disposed between said access opening and said second roller means, said doors extending outwardly from said first rail means and relative to said opening whereby the center of gravity thereof is forwardly of a vertical plane containing said first rail means to create a moment urging said second roller means into engagement with said surface portion,
    motive means coupled to said door means for moving the latter between open and closed positions relative to said access opening,
    and exhaust means extending through the upper wall of said enclosure and being movable toward and away from the upper end of said vessel for collecting gases evolved from said vessel.

2. The invention set forth in claim 1 wherein said upper rail means is disposed above the door means and extends in a direction generally parallel to said access opening, means mounting said first roller means on the upper end of said door means, said second rail means extending in a direction generally parallel to said first rail means.

3. The invention set forth in claim 2 wherein said door means includes first and second door portions independently mounted for movement in opposite directions laterally of said opening and between open and closed positions relative thereto, said second rail means comprising spaced apart first and second rail portions each extending laterally away from said access opening, and with their inner ends adjacent the opposite sides of said opening so that the center portion of said opening is not fronted by said rail portions, said second roller means including separate roller assemblies mounted on each door portion and adjacent a lateral side thereof for engaging one of said first and second rail portions, said motive means being coupled to said first and second door portions for moving the latter toward and away from each other to expose said opening, said second roller means being displaced laterally from the sides of said access opening when said door portions are open.

4. The invention set forth in claim 1 wherein said door means includes first and second door portions independently mounted for movement in opposite directions laterally of said opening and between open and closed positions relative thereto, said motive means being operable to move said door portions in opposite directions toward and away from said access opening and between open and closed positions relative thereto.

5. The invention set forth in claim 4 wherein said second rail means comprises first and second aligned spaced apart rail portions extending away from each other and laterally away from said access opening, the inner ends of said rail portions being disposed adjacent the sides of said opening, said second roller means including first and second separate roller assemblies mounted on each door and adjacent lateral sides thereof and each engaging one of said rail portions, said first and second roller assemblies being displaced laterally from each other and the sides of said access opening when said door means are open.

6. The invention set forth in claim 5 wherein said first and second rail portions are disposed forwardly relative to said first rail means and each has a surface portion disposed between said access opening and its respective roller assembly, the lower ends of said door portions extending forwardly to create a moment urging said roller assemblies into engagement with said surface portions.

7. A converter vessel having a metal receiving opening formed adjacent an upper end,
    tuyere means for injecting oxygen and a hydrocarbon shielding fluid beneath the level of metal in the vessel whereby substantial quantities of off-gases are generated,
    an enclosure having an upper wall portion disposed above said vessel and side wall portions extending downwardly along the sides of said vessel,
    exhaust means extending through the upper wall of said enclosure and being movable toward and away from the upper end of said vessel for collecting said off-gases,
    an access opening formed in one of said wall portions, door means disposed adjacent said opening and externally of said enclosure, said door means having an inner surface facing said vessel and an outer surface,
    door support means disposed externally of said enclosure and adjacent said access opening, said door means being movably mounted on said door support means for movement between open and closed positions relative to said access opening,
    said door support means generally outside the marginal confines of said access opening when said door means is in an open position, said door means being disposed between said access opening and said door support means when said door means is in a closed position, said mounting means including elongate door support means disposed generally above and parallel to the upper end of said door means and first rail means disposed adjacent the lower end of said door means, door suspension means on the upper end of said door means and at a higher elevation than said access opening and being movably mounted on said door support means, first roller means mounted on the lower end of said door means adjacent the outer surface thereof and engaging said rail means, rail means having a generally vertical surface formed on the side thereof disposed away from said opening, said door means extending outwardly from said access opening and relative to a vertical opening containing said door support means to create a moment about said door support means urging said first roller means into engagement with said surface portion.

8. The invention set forth in claim 7 wherein said door means includes first and second door portions each including door suspension means independently mounted on said door support means for movement in opposite directions laterally of said access opening and between open and closed positions relative thereto, said first rail means comprising spaced apart first and second rail portions, said first roller means comprising first and second roller assemblies each mounted respectively on one of said doors and engagable with one of said rail assemblies.

9. The invention set forth in claim 8 wherein said door support means comprises second rail means, said door suspension means comprising first and second suspension assemblies extending respectively upwardly from each of said door portions for engaging said second rail means to support said door portions, said first and second rail portions being mounted adjacent the lower end of said door means and extending in a direction generally parallel to said second rail means.

10. The invention set forth in claim 9 wherein said first and second rail portions comprises aligned, first and second spaced apart rail portions extending away from each other and laterally away from said access opening, said first and second roller assemblies being mounted on its respective door portion adjacent a lateral side thereof, and each engaging one of said rail portions, said first and second roller assemblies being displaced laterally from the sides of said access opening when said door portions are open, the gap between said first and second rail portions being in general alignment with said access opening so that the gap between said doors when the latter are in an open position is not fronted by said rail portions.

11. A converter vessel having a metal receiving opening formed adjacent an upper end, an enclosure having an upper wall portion disposed above said vessel and side wall portions extending downwardly along the sides of said vessel, exhaust means extending through the upper wall of said enclosure and being movable toward and away from the upper end of said vessel for collecting gases evolved from said vessel, an access opening formed in one of said wall portions, door means mounted adjacent said opening and externally of said enclosure and including first and second doors independently mounted for movement in opposite directions laterally of said opening and between open and closed positions relative thereto, first and second independently operable drive means and first and second coupling means each connecting one of said drive means to one of said doors and operable for moving the doors toward and away from said access opening and between open and closed positions relative thereto, and interlocking means interconnecting said first and second coupling means for moving both of said doors simultaneously when one of said motive means is inoperative whereby both said doors may be closed to prevent the escape of polluting gases from said enclosure in the event the motive means connected to one of said doors becomes inoperative.

12. The invention set forth in claim 11 and including mounting means disposed externally of said enclosure for movably supporting said doors and including first rail means disposed at the upper end of said doors and second rail means disposed adjacent the lower end of said doors, first roller means mounted on the upper end of each door for engaging said first rail means, said second rail means comprising aligned, first and second spaced apart rails extending away from each other and laterally away from said access opening, and a roller assembly mounted on each door adjacent a lateral side thereof, and each engaging one of said rails, said roller assemblies being displaced laterally from the sides of said access opening when said door portions are open, the gap between said second rails being in general alignment with said access opening so that the gap between said doors when the latter are in an open position is not fronted by said rail portions.

13. The invention set forth in claim 11 wherein said coupling means includes drum means and a cable wound around said drum means and coupled to its respective door, said interlocking means also including a pair of drums, one of said cables being wound around a different one of said pair of drums, and means connecting said pair of drums for simultaneous rotation.

14. The invention set forth in claim 11 wherein said connecting means comprises gear means.

15. The invention set forth in claim 14 and including track means extending in a direction generally parallel to said opening and roller means supporting each of said doors on said track means.

16. The invention set forth in claim 15 wherein said mounting means includes first rail means adjacent the upper end of said doors and second rail means disposed adjacent the lower end of said doors and first and second roller means mounted on said doors and respectively engaging said upper and lower rail means.

17. The invention set forth in claim 16 wherein said second rail means has a surface portion disposed between said access opening and said second roller means, the lower end of said doors extending forwardly to create a moment urging said second roller means into engagement with said surface portion.

18. The invention set forth in claim 12 and including door suspension means mounted on the upper end of each door for supporting said first roller means, said rails each having a generally vertical surface formed on the side thereof disposed away from said access opening, said door means extending outwardly from said access opening and relative to a vertical opening containing said first rail means to create a moment about said door support means urging said first roller means into engagement with said surface portion.

19. The vessel set forth in claim 11 wherein each of said coupling means is connected to said interlocking means, each drive means being operable to move said coupling means in door opening and closing directions to effect movement of its associated door, said interlocking means being operative to transfer motion from each coupling means to the other to effect operation of said other door in the event its associated drive means is inoperative.

* * * * *